(12) United States Patent
Sasaki et al.

(10) Patent No.: US 7,910,222 B2
(45) Date of Patent: Mar. 22, 2011

(54) POLYMERIZABLE COMPOSITION FOR FORMING OPTICAL DEVICE, OPTICAL DEVICE AND METHOD FOR PRODUCING OPTICAL DEVICE

(75) Inventors: Hiroki Sasaki, Shizuoka (JP); Masataka Sato, Shizuoka (JP); Hirokazu Kyota, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 992 days.

(21) Appl. No.: 11/718,549

(22) PCT Filed: Nov. 4, 2005

(86) PCT No.: PCT/JP2005/020657
§ 371 (c)(1),
(2), (4) Date: May 3, 2007

(87) PCT Pub. No.: WO2006/049318
PCT Pub. Date: May 11, 2006

(65) Prior Publication Data
US 2007/0299204 A1    Dec. 27, 2007

(30) Foreign Application Priority Data

Nov. 5, 2004 (JP) ................................. 2004-322568

(51) Int. Cl.
| | | |
|---|---|---|
| B32B 27/00 | (2006.01) | |
| B29D 11/00 | (2006.01) | |
| C08L 73/00 | (2006.01) | |
| C08F 2/00 | (2006.01) | |
| C08F 18/20 | (2006.01) | |

(52) U.S. Cl. ........ 428/500; 524/599; 526/214; 526/222; 526/245; 526/292.5; 526/326; 264/2.1

(58) Field of Classification Search ................. 526/222, 526/245, 292.5
See application file for complete search history.

(56) References Cited

U.S. PATENT DOCUMENTS 5,824,372 A * 10/1998 Pechhold ................... 427/393.5

FOREIGN PATENT DOCUMENTS

| | | |
|---|---|---|
| JP | 60-260905 | 12/1985 |
| JP | 63-115106 | 5/1988 |
| JP | 05-173025 A | 7/1993 |
| JP | 08-262240 A | 10/1996 |
| JP | 10-034844 | 2/1998 |
| JP | 11-291627 | 10/1999 |
| JP | 2001-215345 A | 8/2001 |
| JP | 2003-139973 | 5/2003 |
| JP | 2005/139345 | 6/2005 |

* cited by examiner

*Primary Examiner* — Sheeba Ahmed
(74) *Attorney, Agent, or Firm* — Sughrue Mion, PLLC

(57) ABSTRACT

A polymerizable composition for forming an optical device, which comprises a polymerizable monomer of the following formula (1) and a polymerizable monomer of the following formula (2). Using the composition makes it possible to produce an optical device which has a high light transmittability and keeps a reduced transmission loss even in wet.

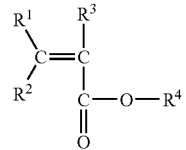

Formula (1)

wherein $R^1$ and $R^2$ each are H or D; $R^3$ is H, D, $CH_3$, $CD_3$ or a halogen atom; $R^4$ is an alkyl group having from 2 to 8 carbon atoms and at least partly substituted with a fluorine atom,

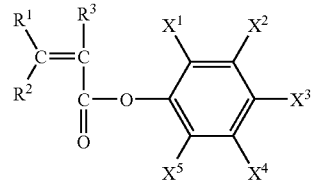

Formula (2)

wherein $R^1$ and $R^2$ each are H or D; $R^3$ is H, D, $CH_3$, $CD_3$ or a halogen atom; $X^1$ to $X^5$ each are H, D, a halogen atom or $CF_3$, and at least one of $X^1$ to $X^5$ is a halogen atom or $CF_3$.

16 Claims, 1 Drawing Sheet

POLYMERIZABLE COMPOSITION FOR FORMING OPTICAL DEVICE, OPTICAL DEVICE AND METHOD FOR PRODUCING OPTICAL DEVICE

TECHNICAL FIELD

The present invention belongs to a technical field of plastic optical devices and polymerizable compositions for forming them, in particular to a technical field of plastic optical devices favorably used for optical fibers, optical waveguides and optical lenses, and polymerizable compositions for forming such plastic optical devices.

BACKGROUND ART

Plastic optical devices are generally superior to glass-based optical devices having the same constitution in that they have good shapability and workability, they are lightweight, they are inexpensive, they are flexible and they have good impact resistance. For example, as compared with glass-based optical fibers, plastic optical fibers (POFs) are relatively unsuitable to long-distance light transmission since the light transmission loss through them is great, but their advantage intrinsic to the plastic materials constituting them is that the core diameter of the optical fibers may be large, for example, to be tens μm or more. As having such a large core diameter, the plastic optical fibers do not require any superfluous connection accuracy of various peripheral members or units with them in branching or connecting the optical fibers. Accordingly, POFs enable easy connection and terminal working with peripheral members or units, and the cost of the connectors and others for them may be reduced. Still another advantage thereof is that POFs do not require high-accuracy core control. In addition, since POFs are plastic, they has further advantages in that their risk of sticking in human bodies is low, they are flexible and are therefore easy to work and to lay, they are resistant to shock and their cost is low. Accordingly, not only POFs are noticed for household appliances and vehicles, but also they are being investigated for their application to internal wiring in high-speed data processors and to ultra-short-distance and large-capacity cables for DVI (digital video interface) links.

In general, POF comprises a core and a clad, in which the clad is an outer shell and the core fills the space inside the clad, and the refractive index of the core is higher than that of the clad. Recently, a refractive index profile POF, in which the core has a refractive index profile that varies from its center to its outside, has become specifically noticed as an optical fiber having a high transmission capacity. One method known for producing the refractive index profile POF comprises preparing an optical fiber preform and then melt-stretching the preform.

In preparing the preform, a polymerizable compound to form a core is put into a pipe for a clad, the clad pipe is put into a tubular chamber, and the core is formed therein while the tubular chamber is rotated. During the core formation, the polymerizable compound in the core-forming composition is polymerized so as to form the core tubularly successively from the side of the clad pipe to the center thereof, while the content of a compound for refractivity control in the composition is varied toward the center of the pipe. The core thus formed according to the polymerization method has a concentration profile of the refractivity controlling-agent contained therein, and accordingly the core has a refractive index profile. The preform thus formed is stretched at a predetermined temperature to give a refractive index profile, plastic optical fiber (e.g., see JP-A 5-173025, 8-262240, 2001-215345).

DISCLOSURE OF THE INVENTION

According to the proposal by the above-mentioned three references, only a combination of methyl methacrylate (MMA) and benzyl methacrylate (BZMA) is concretely shown as a concrete example of a preferred combination of plural monomers. The data of the refractive index profile of this combination are shown, but the data of transmission loss of the fibers are not shown and are therefore unclear. Moreover, so far as MMA is used and even though the C—H bond therein is substituted with deuterium, then the polymer in wet may absorb water depending on the MMA content thereof, and, as a result, the transmission loss through the fibers of the polymer may increase based on the higher harmonic wave of the molecular vibration of the oxygen-hydrogen bond in the polymer. In addition, in the polymer, there may remain various components used in its production, for example, when the polymer is produced by polymerizing monomers, then any other component such as chain transfer agent may remain therein, and the remaining component except the main component in the polymer may increase the transmission loss through the fibers of the polymer. Moreover, optical transmission devices are generally used as optical fibers that are drawn by stretching, and in such a case, the polymer must be physically stretchable.

Given that situation, an object of the invention is to provide a polymerizable composition for forming an optical device that has the advantages of high light transmission capability and low transmission loss even when having absorbed moisture, and a method for producing the composition. Another object of the invention is to provide such an optical device that has the advantages of high light transmission capability and low transmission loss even when having absorbed moisture.

To attain the objects, the invention includes the following:

(1) A polymerizable composition for forming an optical device, which comprises a polymerizable monomer of the following formula (1) and a polymerizable monomer of the following formula (2):

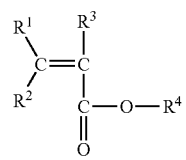

Formula (1)

wherein $R^1$ and $R^2$ each independently represent H or D; $R^3$ represents H, D, $CH_3$, $CD_3$ or a halogen atom; $R^4$ represents an alkyl group having from 2 to 8 carbon atoms and at least partly substituted with a fluorine atom,

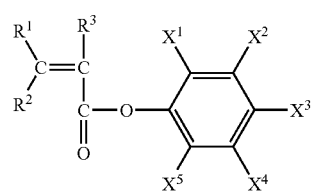

Formula (2)

wherein $R^1$ and $R^2$ each independently represent H or D; $R^3$ represents H, D, $CH_3$, $CD_3$ or a halogen atom; $X^1$ to $X^5$ each independently represent H, D, a halogen atom or $CF_3$, and at least one of $X^1$ to $X^5$ is a halogen atom or $CF_3$.

(2) The polymerizable composition for forming an optical device of (1), which further comprises a chain transfer agent comprising a fluorine-substituted thiol.

(3) The polymerizable composition for forming an optical device of (2), wherein the fluorine content of the fluorine-substituted thiol is at least 20% by mass.

(4) The polymerizable composition for forming an optical device of (2) or (3), wherein the fluorine-substituted thiol is at least one compound of the following formulae (3), (4) and (5):

Formula (3)

wherein A represents H, D or a fluorine atom; p and r are integers that satisfy $15 > p \geq r \geq 0$,

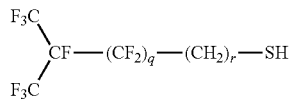

Formula (4)

wherein q and r are integers that satisfy $15 > q \geq r \geq 0$,

Formula (5)

wherein R represents an alkyl group at least partly substituted with a fluorine atom, or an aryl group at least partly substituted with a fluorine atom or a group $CF_3$; and n indicates an integer of from 1 to 12.

(5) A method for producing an optical device, which comprises polymerizing the polymerizable composition for forming an optical device of any of (1) to (4).

(6) A method for producing an optical device, which comprises polymerizing the polymerizable composition for forming an optical device of any of (1) to (4) thereby to form a core that has a gradually increasing refractive index profile.

(7) A method for producing an optical device, which comprises injecting the polymerizable composition for forming an optical device of any of (1) to (4), into a cylindrical chamber rotating around a center of the axis thereof held horizontally, and polymerizing it therein to form a clad that has a constant refractive index from the wall face of the cylindrical chamber to the center thereof, and gradually injecting the polymerizable composition for forming an optical device of any of (1) to (4) in which the compositional ratio of the monomer of formula (2) to the monomer of formula (1) gradually increases, from the interface of the clad to the center thereof, and polymerizing it therein to form a core that has a gradually increasing refractive index profile.

(8) An optical device produced according to the production method of (5) or (6).

(9) The optical device of (8), which has a refractive index profile region where the refractive index thereof varies.

(10) An optical device comprising a copolymer of a polymerizable monomer of the following formula (1) and a polymerizable monomer of the following formula (2):

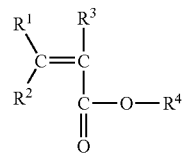

Formula (1)

wherein $R^1$ and $R^2$ each independently represent H or D; $R^3$ represents H, D, $CH_3$, $CD_3$ or a halogen atom; $R^4$ represents an alkyl group having from 2 to 8 carbon atoms and at least partly substituted with a fluorine atom,

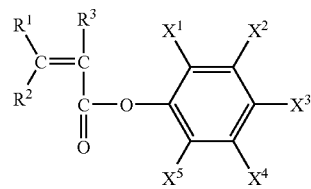

Formula (2)

wherein $R^1$ and $R^2$ each independently represent H or D; $R^3$ represents H, D, $CH_3$, $CD_3$ or a halogen atom; $X^1$ to $X^5$ each independently represent H, D, a halogen atom or $CF_3$, and at least one of $X^1$ to $X^5$ is a halogen atom or $CF_3$.

(11) The optical device of (10), which comprises a copolymer of a polymerizable monomer of formula (1) and a polymerizable monomer of formula (2) and in which the copolymers of the type each having a different copolymerization ratio are laminated in layers.

(12) The optical device of (11), wherein the copolymers each having a different copolymerization ratio are laminated concentrically with each other and are so disposed that the copolymerization ratio may monotonically change from the outer periphery to the center part of the device.

The plastic optical device produced from the polymerizable composition for forming an optical device of the invention has a high light transmission capability and it may keep a low transmission loss even in wet.

Figure 1:
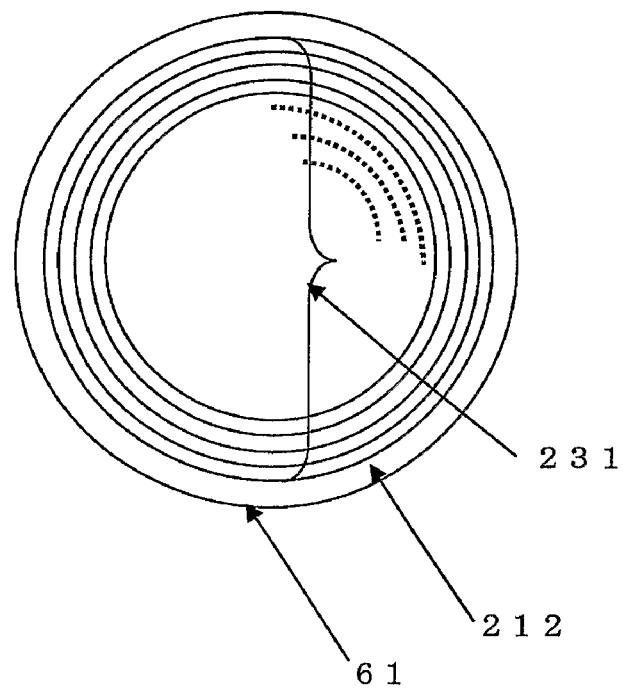
FIG. 1 is a cross-sectional view of a preform having a multi-layered core.

In the drawings, 61 and 62 each are a preform; 212 and 213 each are a clad; and 231 and 232 each are a core.

BEST MODE FOR CARRYING OUT THE INVENTION

The invention is described in detail hereinunder. In this description, the numerical range expressed by the wording "a number to another number" means the range that falls between the former number indicating the lowermost limit of the range and the latter number indicating the uppermost limit thereof.

Unless otherwise specifically indicated herein, "H" means a hydrogen atom, and "D" means a deuterium atom. Also unless otherwise specifically indicated, "polymerization" as referred to herein is meant to include "copolymerization".

1. Polymerizable Composition for Forming Optical Device

The polymerizable composition for forming an optical device of the invention is described.

The polymerizable composition for forming an optical device of the invention comprises different types of polymerizable monomers that are limited in point of their constitution. Preferably, the polymerizable composition for forming an optical device of the invention comprises a chain transfer agent comprising a fluorine-substituted thiol. The polymerizable composition for forming an optical device of the invention is favorably used for optical devices, especially for refractive index profile optical devices having a refractive index profile. The materials are described in detail hereinunder.

1-1. Polymerizable Monomer:

The polymerizable composition for forming an optical device of the invention comprises at least one polymerizable monomer of the following formula (1) and at least one polymerizable monomer of the following formula (2). The polymerizable monomer of formula (1) is described.

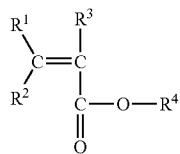

Formula (1)

In formula (1), $R^1$ and $R^2$ each independently represent H or D; $R^3$ represents H, D, $CH_3$, $CD_3$ or a halogen atom (preferably fluorine atom or chlorine atom); $R^4$ represents an alkyl group having from 2 to 8 carbon atoms and at least partly substituted with a fluorine atom.

Preferably, $R^1$ and $R^2$ are D. Preferably $R^3$ is H, D, $CH_3$, $CD_3$, or a fluorine atom or a chlorine atom, more preferably $CD_3$, or a fluorine atom or a chlorine atom, even more preferably $CD_3$. Preferably, $R^4$ is a fluorine-substituted alkyl group having from 2 to 6 carbon atoms, more preferably a fluorine-substituted alkyl group having from 2 to 4 carbon atoms. The fluorine-substituted alkyl group may be branched or cyclic, but is preferably linear. Preferably, the C—H bond existing in the fluorine-substituted alkyl group is partly or wholly substituted with a C—D bond. Specifically, the formula (1) preferably has a deuterated fluoroalkyl methacrylate, in which the deuteration degree (D/(D+H)) is preferably from 95% to less than 100%.

Specific examples of the compounds of formula (1) are mentioned below. Needless-to-say, the invention should not be limited to these compounds.

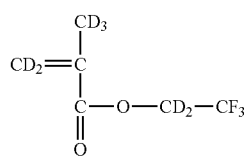

FA-1

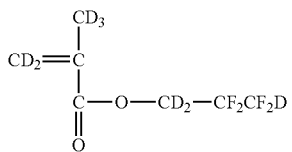

FA-2

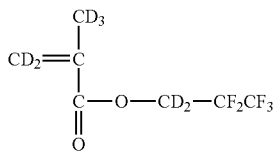

FA-3

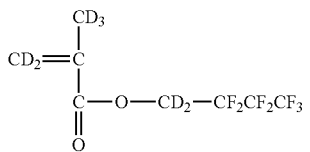

FA-4

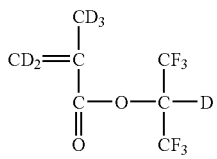

FA-5

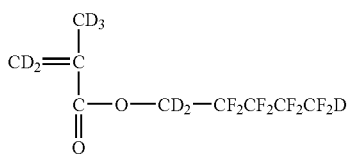

FA-6

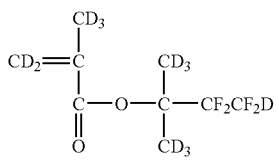

FA-7

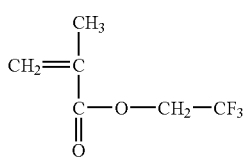

FA-8

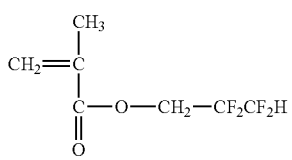

FA-9

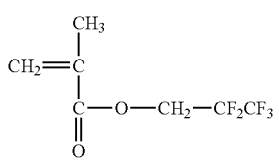

FA-10

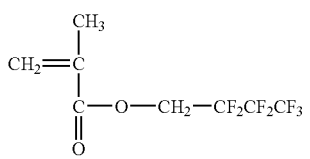

FA-11

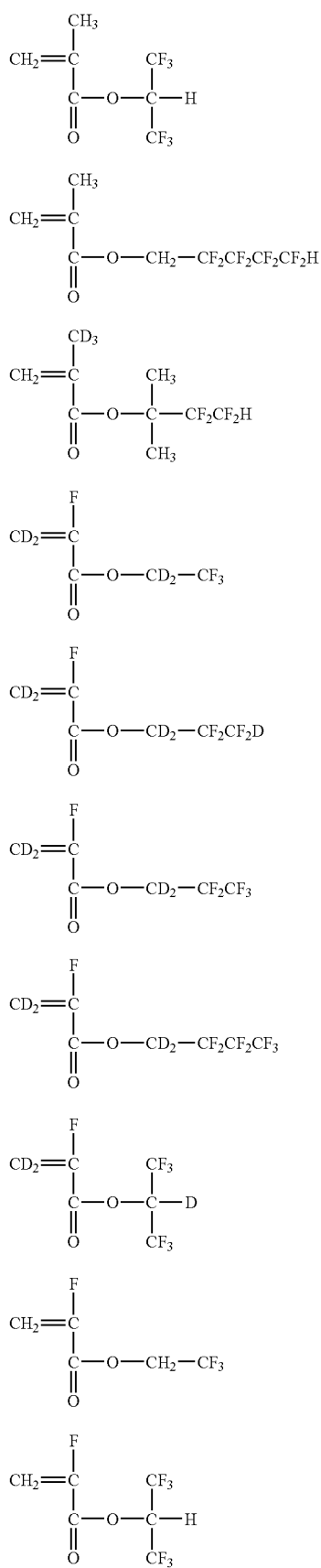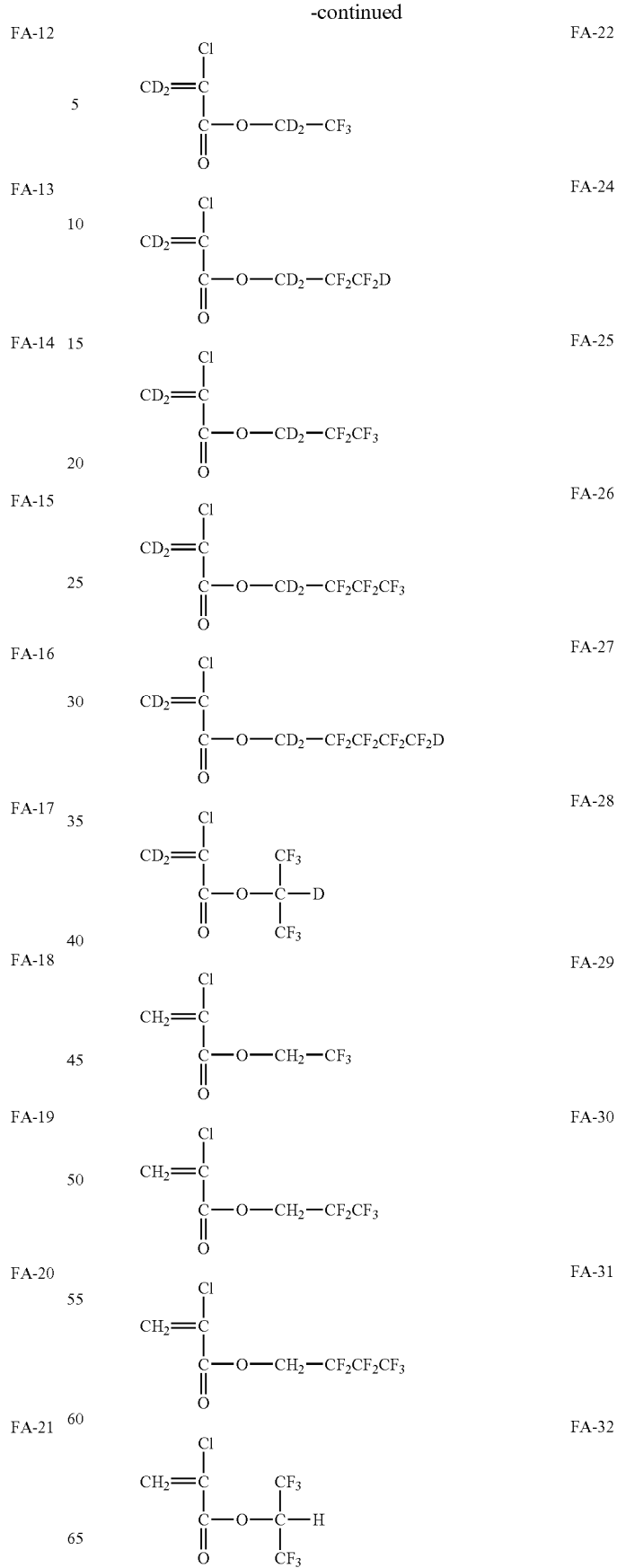

FA-33

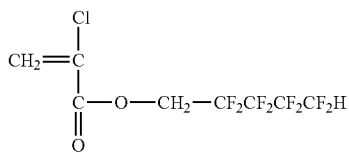

The polymerizable monomer of formula (2) is described.

Formula (2)

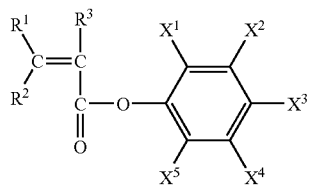

In formula (2), $R^1$ and $R^2$ each independently represent H or D; $R^3$ represents H, D, $CH_3$, $CD_3$ or a halogen atom; $X^1$ to $X^5$ each independently represent H, D, a halogen atom or $CF_3$, and at least one of $X^1$ to $X^5$ is a halogen atom or $CF_3$. Preferably, $R^1$ and $R^2$ are D. Preferably, $R^3$ is H, D, $CH_3$, $CD_3$, or a fluorine atom or a chlorine atom, more preferably $CD_3$. Preferably, $X^1$ to $X^5$ each are independently a fluorine atom, a chlorine atom or $CF_3$, more preferably a fluorine atom or a chlorine atom. In formula (2), the number of the halogen atoms (especially preferably fluorine atoms) on the phenyl group is preferably at least 2, most preferably at least 3.

Specifically, the formula (2) preferably has a deuterated halogenophenyl methacrylate, in which the deuteration degree is preferably from 95% to less than 100%.

Specific examples of the compounds of formula (2) are mentioned below. Needless-to-say, the invention should not be limited to these compounds.

FP-1

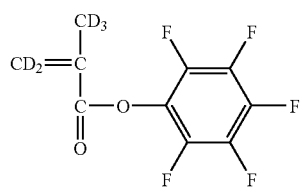

FP-2

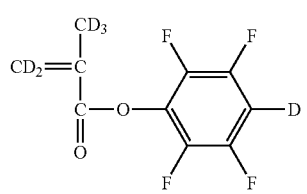

FP-3

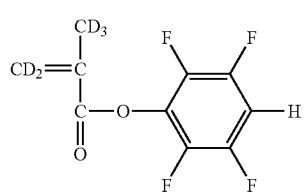

FP-4

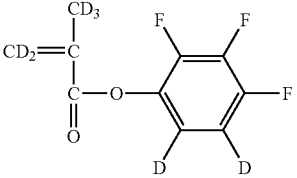

FP-5

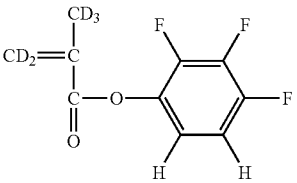

FP-6

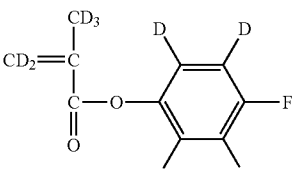

FP-7

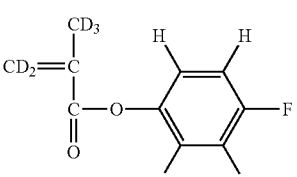

FP-8

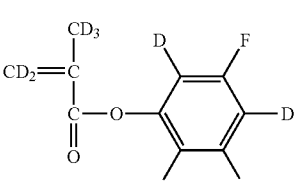

FP-9

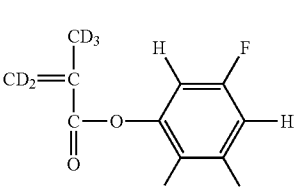

FP-10

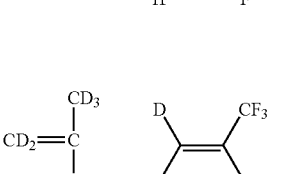

FP-11

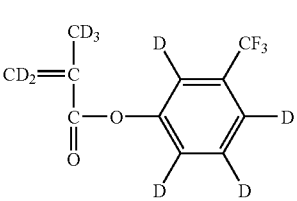

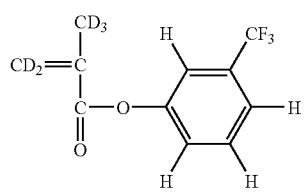
FP-12
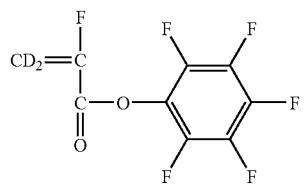
FP-13
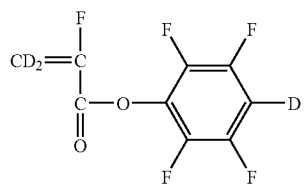
FP-14
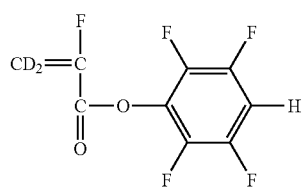
FP-15
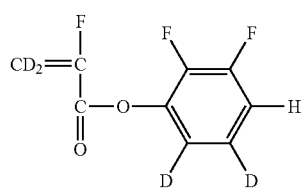
FP-16
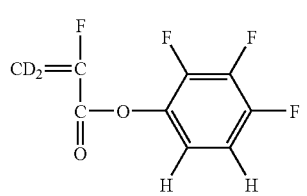
FP-17
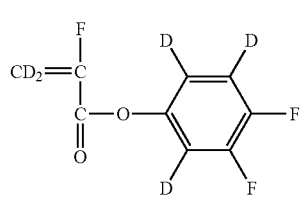
FP-18
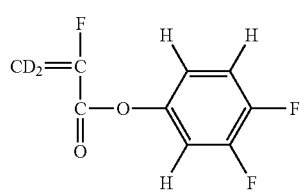
FP-19
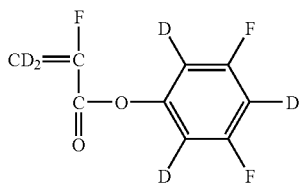
FP-20
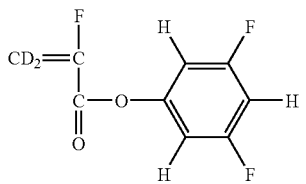
FP-21
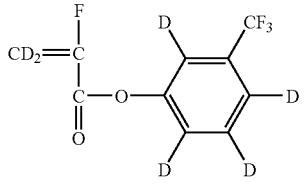
FP-22
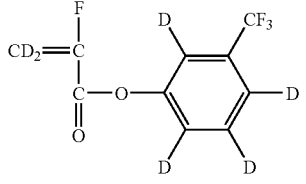
FP-23
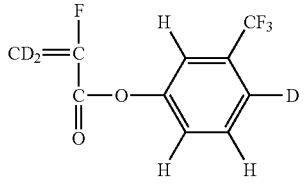
FP-24
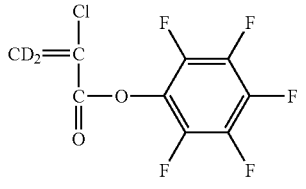
FP-25
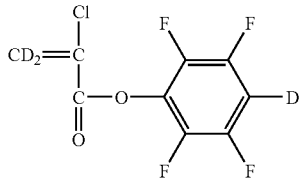
FP-26
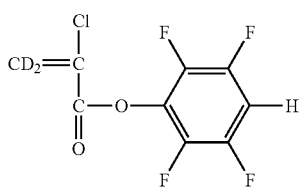
FP-27

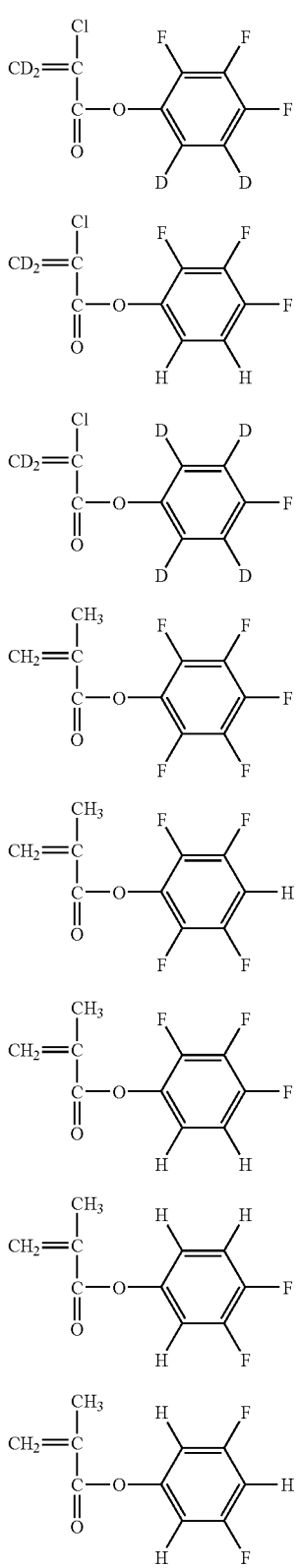

The refractive index of the polymer of the polymerizable monomer of formula (1) differs from that of the homopolymer of the polymerizable monomer of formula (2). Therefore, varying the compositional ratio in copolymerization of the polymerizable monomer of formula (1) and the polymerizable monomer of formula (2) gives copolymers having a varying refractive index. Concretely, for example, a homopolymer of FP-1 has a refractive index of 1.42; and a homopolymer of FA-1 has a refractive index of 1.50. Gradually varying the compositional ratio in copolymerization of the two may give an optical resin having a refractive index profile.

1-2. Polymerization Initiator:

The polymerizable composition for forming an optical device of the invention may comprise a polymerization initiator to initiate the polymerization of the above-mentioned polymerizable monomers. Any polymerization initiator may be selected herein depending on the type of the monomers used and the polymerization method employed. For example, it includes peroxide compounds such as benzoyl peroxide (BPO), tert-butylperoxy-2-ethylhexanoate (PBO), di-tert-butyl peroxide (PBD), tert-butylperoxyisopropyl carbonate (PBI), n-butyl-4,4-bis(tert-butylperoxy)valerate (PHV), as in WO93/08488. In addition, it further includes azo compounds such as 2,2'-azobisisobutyronitrile, 2,2'-azobis(2-methylbutyronitrile), 1,1'-azobis(cyclohexane-1-carbonitrile), 2,2'-azobis(2-methylpropane), 2,2'-azobis(2-methylbutane), 2,2'-azobis(2-methylpentane), 2,2'-azobis(2,3-dimethylbutane), 2,2'-azobis(2-methylhexane), 2,2'-azobis(2,4-dimethylpentane), 2,2'-azobis(2,3,3-trimethylbutane), 2,2'-azobis(2,4,4-trimethylpentane), 3,3'-azobis(3-methylpentane), 3,3'-azobis (3-methylhexane), 3,3'-azobis(3,4-dimethylpentane), 3,3'-azobis(3-ethylpentane), dimethyl-2,2'-azobis(2-methylpropionate), diethyl-2,2'-azobis(2-methylpropionate), di-tert-butyl-2,2'-azobis(2-methylpropionate).

Needless-to-say, the polymerization initiator for use in the invention should not be limited to the above. If desired, two or more of the compounds may be combined for use herein.

1-3. Chain Transfer Agent

The polymerizable composition for forming an optical device of the invention may comprise a chain transfer agent. The chain transfer agent is essentially for controlling the molecular weight of the polymer produced herein. The type and the amount of the chain transfer agent for use herein may be selected and determined depending on the type of the polymerizable monomers to be copolymerized. Preferably, the chain transfer agent is a thiol, more preferably a fluorine-substituted thiol. The fluorine-substituted thiol, if used in the composition, may reduce the transmission loss through the polymer produced and may improve the light transmission capability of the polymer. When a refractive index profile optical device is formed, then the chain transfer agent of the type is more preferably used in the polymerizable composition since the polymer produced may ensure an enlarged refractive index profile and since the polymer may readily have a refractive index profile device formed therein.

Preferably, the fluorine-substituted thiol has a fluorine content of at least 20% by mass in the device, more preferably at least 25% by mass, even more preferably at least 30% by mass. The fluorine-substituted thiol is preferably at least one compound of the following formulae (3), (4) and (5), more preferably formula (5):

$$A\text{---}CF_2\text{---}(CF_2)_p\text{---}(CH_2)_r\text{---}SH \qquad \text{Formula (3)}$$

wherein A represents H, D or a fluorine atom; p and r are integers that satisfy $15 > p \geq r \geq 0$.

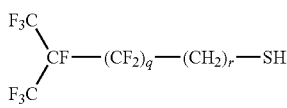
Formula (4)

wherein q and r are integers that satisfy $15>q\geq r\geq 0$.

In formulae (3) and (4), p, q and r are integers that satisfy $15>p\geq r\geq 0$ and $15>q\geq r\geq 0$. Satisfying these, p is preferably an integer of from 1 to 12, more preferably from 2 to 8; q is preferably an integer of from 1 to 12, more preferably from 2 to 8; and r is preferably an integer of from 0 to 4, more preferably 1 or 2.

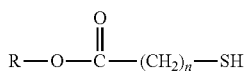
Formula (5)

wherein R represents an alkyl group at least partly substituted with a fluorine atom, or an aryl group at least partly substituted with a fluorine atom or a group $CF_3$; and n indicates an integer of from 1 to 12.

The fluorine-substituted alkyl group (fluoroalkyl group) may be linear, branched or cyclic, but preferably having from 1 to 20 carbon atoms. The fluoroalkyl group may be further substituted. Specific examples of the fluoroalkyl group include a 2,2,2-trifluoroethyl group, a 2,2,3,3-tetrafluoropropyl group, a 2,2,3,3,3-pentafluoropropyl group, a 1-trifluoromethyl-2,2,2-trifluoroethyl group, a 2,2,3,3,4,4,5,5-octafluoropentyl group, a 2,2,3,3,4,4-hexafluorobutyl group, ahexafluoroisopropyl group, a hexafluoro-2-methylisopropyl group, a perfluorocyclohexylmethyl group and a 2,2,3,3-tetrafluorocyclobutyl group, that are optionally substituted with any of a halogen atom, an alkyl group and a halogenoalkyl group.

The alkyl group at least partly substituted with a fluorine atom, as referred to herein, is meant to indicate that only the substituent moiety of the alkyl group is substituted with a fluorine atom.

The aryl group substituted with a fluorine atom or a group $CF_3$ may be further substituted. For the substituents for the group, preferred are those mentioned hereinabove for the fluoroalkyl group.

Examples of the compounds of formulae (3), (4) and (5) are mentioned below.

 SH-1
 SH-2
 SH-3
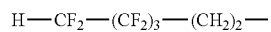 SH-4
 SH-5
 SH-6
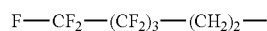 SH-7
 SH-8
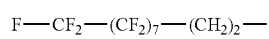 SH-9

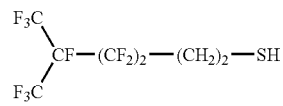 SH-10
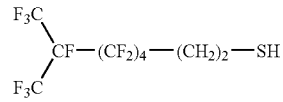 SH-11
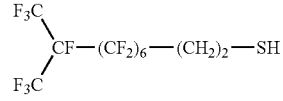 SH-12
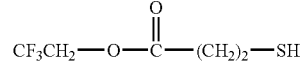 SH-13
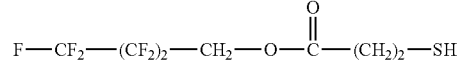 SH-14
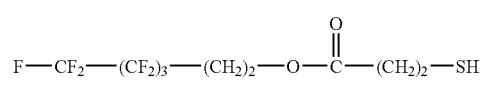 SH-15
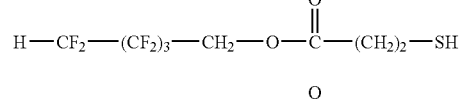 SH-16
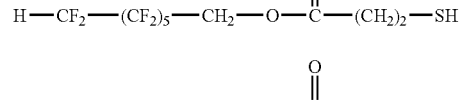 SH-17
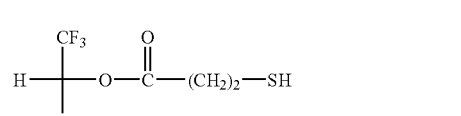 SH-18
 SH-19
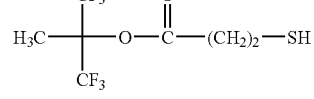 SH-20
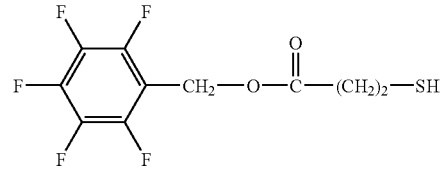 SH-21
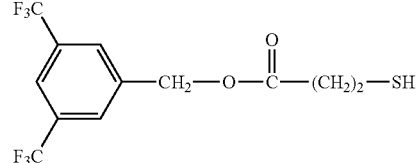 SH-22
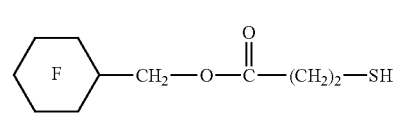 SH-23

-continued

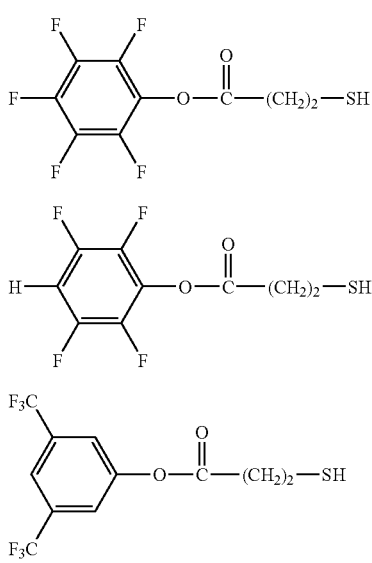

SH-24

SH-25

SH-26

Two or more different types of the chain transfer agents may be used herein, as combined.

1-4. Dopant:

The polymerizable composition for forming an optical device of the invention may comprise a compound having a refractive index different from that of the homopolymers of the polymerizable monomers therein (this may be herein after referred to as "dopant"). The optical device formed from the polymerizable composition that comprises such a dopant may have a refractive index profile readily introduced thereinto. The dopant is characterized in that the solubility parameter difference between the dopant and the polymer produced through polymerization of the monomer is within 7 $(cal/cm^3)^{1/2}$, that the refractive index of the composition comprising the dopant differs from that of the composition not comprising it (the former may be higher or lower than the latter) and that the refractive index difference between the two is at least 0.001, as in WO93/08488 and JP-A 5-173026. Having the property, a material which is stable under the polymerization condition (e.g., heating, irradiation with light, pressure application) of the polymerizable monomer, which can coexist in the composition along with the polymer produced, and which does not copolymerize with the monomer that is to constitute the polymer can be used as the dopant. For example, preferred are hexafluorobenzene, perfluorodecalin, perfluoro(1,3-dipropoxycyclohexane), benzyl benzoate (BEN), diphenyl sulfide (DPS), triphenyl phosphite (TPP), benzyl-n-butyl phthalate (BBP), diphenyl phthalate (DPP), biphenyl (DP), diphenylmethane (DPM), tricresyl phosphate (TCP), diphenyl sulfoxide (DPSO); more preferred are BEN, DPS, TPP, DPSO. In addition to these low-molecular organic compounds, the dopant may include di- to deca-oligomers (e.g., trifluoroethyleneoligomer). Two or more different types of such low-molecular organic compounds for refractivity control may be combined for use herein. In the invention, it is desirable that no dopant is added to the core of the optical device that transmits light but a low-refractivity dopant (e.g., perfluorodecalin) is added to the clad thereof. In the invention, however, no dopant may be added to the polymerizable composition.

In the invention, gradually varying the compositional ratio of the polymerizable monomer of formula (1) to the polymerizable monomer of formula (2) in the polymerizable composition may give a refractive index profile optical device. For gradually varying the compositional ratio of the polymerizable monomer of formula (1) to the polymerizable monomer of formula (2) in the composition, herein employable is a method of interfacial gel polymerization or (continuous or successive) rotary copolymerization that will be described below.

Though not indiscriminately defined as varying depending on their types, the preferred range of the constitutive components of the polymerizable composition for forming an optical device of the invention may be generally as follows: The polymerization initiator is preferably from 0.005 to 0.5% by mass of the polymerizable monomers, more preferably from 0.01 to 0.5% by mass thereof. The chain transfer agent is preferably from 0.01 to 40% by mass of the polymerizable monomers, more preferably from 0.015 to 0.30% by mass thereof. The dopant, if any in the composition, is preferably from 1 to 30% by mass of the polymerizable monomers, more preferably from 1 to 25% by mass thereof.

Any other dopant may be added to the polymerizable composition for forming an optical device of the invention, not detracting from the polymerization reactivity of the composition and the light transmittability of the polymer. For example, for the purpose of improving the weather resistance and the durability of the optical device formed of the composition, a stabilizer such as antioxidant or light-resistant agent may be added to the composition. For the purpose of improving the light transmittability of the optical device, a compound having a function of induced emission for optical signal amplification may be added to the composition. Comprising the compound added thereto, the composition may give an optical device that may amplify attenuated signal light through irradiation with excited light, and therefore the optical device may have a prolonged transmission distance and may be used as a fiber amplifier as a part of a light transmission link.

2. Optical Device and Method for Producing It

When heat and/or light is applied to the polymerizable composition for forming an optical device of the invention, then the fluorine-containing polymerizable monomers in the composition begin to polymerize owing to the action of the radical generated by the polymerization initiator therein. Since the polymerizable composition for forming an optical device of the invention comprises a fluorine-substituted compound as the chain transfer agent therein, the compound, if any, remaining in the polymer (fluorine-containing matrix) may reduce the transmission loss through the optical device formed of the polymer and therefore may improve the light transmittability of the optical device. Further, when the compositional ratio of the polymerizable monomer of formula (1) to the polymerizable monomer of formula (2) in the polymerizable composition is gradually varied, then the composition may form a refractive index profile optical device that has a refractive index profile readily introduced thereinto. The polymerization speed and the degree of polymerization of the polymerizable monomers in the composition may be controlled by the polymerization initiator and the chain transfer agent therein and the polymer produced may have a desired molecular weight. Therefore, for example, when the polymer obtained is stretched and drawn into an optical fiber, then it may be so designed as to have desired mechanical properties suitable for stretching it by controlling the molecular weight thereof. This contributes toward improving the polymer producibility.

The clad material and the core material especially preferred for constituting the preform and POF are those having a high light transmittability. However, in order that the light running through the core may undergo total reflection on the interface between the core and the clad, the clad material comprises a polymer having a lower refractive index that that of the core material. Preferably, the polymer has no optical anisotropy. Also preferably, the polymer for the core material and the polymer for the clad material may well adhere to each other, more preferably, the two polymers both have good mechanical properties such as good toughness and have good wet heat resistance. Preferred examples of the clad material and the core material are mentioned below.

Preferably, the clad material is a fluorine-containing polymer for ensuring the refractivity difference between the clad and the core. For example, preferred are polyvinylidene fluoride (PVDF); fluoro(meth)acrylate resin; fluoropolymer having a cyclic structure in its backbone chain formed through cyclization polymerization as in Japanese Patent No. 2,724,709; radical copolymer of a fluoroaliphatic cyclic structure-having monomer such as perfluoro(2,2-dimethyl-1,3-dioxol) with tetrafluoroethylene, chlorotrifluoroethylene, perfluoro (vinyl ether) or the like, as in JP-B 63-18964. The copolymer composition of a polymerizable monomer of formula (1) and a polymerizable monomer of formula (2) of the invention is also preferred. In this case, it is necessary that the copolymerization composition ratio of the polymerizable monomer of formula (1) to the polymerizable monomer of formula (2) for the clad is lower than the copolymerization composition ratio of the polymerizable monomer of formula (1) to the polymerizable monomer of formula (2) for the center core in order that the core may catch and trap light therein.

For the core material, used is a copolymer of a polymerizable monomer of formula (1) and a polymerizable monomer of formula (2), and it may be optionally copolymerized with any other polymerizable monomer so as to have an increased glass transition temperature Tg not increasing the scattering loss through the core. For example, the additional comonomer includes isopropyl methacrylate (IPMA), t-butyl methacrylate (tBMA), isobornyl methacrylate (IBMA), norbornyl methacrylate (NBMA), tricyclodecanylmethacrylate (TCDMA). In the invention, the polymer for the core material is preferably a copolymer of only the polymerizable monomer of formula (1) and the polymerizable monomer of formula (2). In particular, it is especially desirable that a monomer of formula (1) (e.g., Compound FA-1) is copolymerized with a monomer of formula (2) (e.g., FP-1) with gradually varying the compositional ratio of the two to thereby produce a copolymer having both a refractive index profile and an increased Tg.

Preferably in the invention, the core has a multi-layered laminate structure of copolymers produced by gradually varying the compositional ratio of the polymerizable monomer of formula (1) and the polymerizable monomer of formula (2) for them; or the core is formed of a refractive index profile copolymer produced by gradually varying the compositional ratio of the polymerizable monomer of formula (1) and the polymerizable monomer of formula (2) for it. FIG. 1 is a cross-sectional view of a preform in which the core has a multi-layered structure. The preform 61 has a clad (clad layer) 212 and a core 231, in which the core 231 has a multi-layered structure. In this, the constitutive layers are laminated as the first layer, the second layer, . . . the (n−1)th layer, the n'th layer from the layer that is in contact with the inner face of the core toward the center of the cross section.

Figure 2:
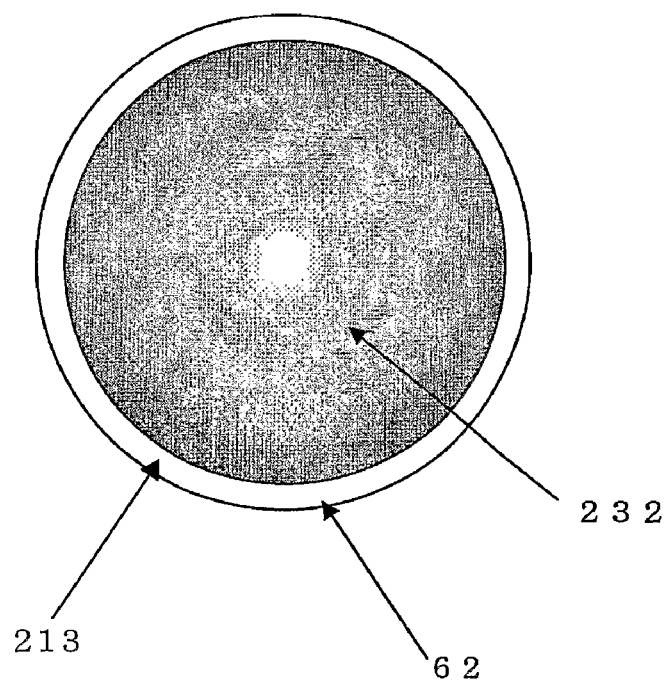
FIG. 2 is a cross-sectional view of a preform where the compositional ratio of a polymerizable monomer of formula (1) to a polymerizable monomer of formula (2) for the core is continuously varied.

FIG. 2 is a cross-sectional view of a preform of a copolymer produced by gradually varying the compositional ratio of the polymerizable monomer of formula (1) and the polymerizable monomer of formula (2) for it. The preform 62 has a clad 213 and a core 232, in which, however, the core does not have any distinct layer.

For producing the preform 61, the core 231 is formed in the hollow of the clad 212. The monomers for the core layer of the first layer is injected into the hollow having an inner clad layer already formed therein, and are polymerized while rotated and while given the necessary energy applied thereto for polymerization, and when the polymerization conversion of the core layer of the first layer has reached at least 80%, then the monomers for the core layer of the second layer are injected into the hollow and rotated and polymerized in the same manner. This is repeated up to the n'th layer. It is desirable that, when the polymerization conversion of the (n−1)th layer has reached at least 80%, the monomer composition for the n'th layer is injected into the hollow and polymerized. In this embodiment, the interlayer blending may be promoted and the micro-phase separation may be prevented. In this case, the concentration of the non-polymerizable refractivity-controlling agent, which acts to impart a refractive index profile to the polymer produced, may be gradually increased from the first layer toward the n'th layer so that the refractive index profile coefficient, g, could be approximated to a range of from 1.5 to 3.

For producing the preform 62, the core 232 is formed inside the clad 213 in the same manner as above. In this case, however, the monomer composition is introduced into the hollow while the compositional ratio of the monomers therein is gradually varied, and the monomers are polymerized therein, for example, as in JP-A 2001-215345, paragraphs [0023] to [0034].

In the embodiments as disclosed herein, the polymerization effected under the condition as above may be stopped through heat treatment under a predetermined condition, and after the polymerization, the polymer may be cooled at a predetermined cooling rate.

In that manner, a preform for a columnar light transmitter may be produced, in which the core and the clad are both plastics and the clad has a two-layered structure of an outer clad and an inner clad. Then, the preform is stretched. The preform may have a hollow in the center of the circular cross section thereof, but the hollow may disappear after the preform has been stretched, and, as a result, POF having a low transmission loss may be produced.

For stretching the preform, employable are various stretching methods as in JP-A 07-234322, paragraphs [0007] to [0016]. Thus stretched, the preform gives POF having a desired diameter of, for example, from 200 μm to 1000 μm.

In general use thereof, POF is covered with at least one protective layer for the purpose of improving the bending resistance, the weather resistance, the wet deterioration resistance, the tensile strength, the stamping resistance, the flame retardancy, the chemical resistance, the noise resistance to external light and the discoloration resistance to thereby improve the commercial value thereof.

The preform is stretched to give POF, and POF is then worked in a first coating step to give an optical fiber core wire. One or more core wires are, either singly or as combined, further worked in a second coating step to give an optical cable. When the optical cable is a single fiber cable, then it may not be worked in the second coating step, but the single fiber coated with a coating layer in the first coating step may be directly used as an optical cable. There are known two modes of covering the optical cable. One core wire is airtightly covered with a coating material, or the outer surface of a bundle of two or more core wires as combined is airtightly covered with it. This is a contact coating mode. Alternatively, one optical fiber core or a bundle of optical fiber cores are loosely covered with a coating material with a space existing in the interface between them. This is a loose coating mode. In the loose coating mode, when the coating layer is peeled off at the joint part at which the cable is connected with a connector, then water may penetrate into the cable through its cut end and may diffuse in the lengthwise direction of the cable. Therefore, in general, the contact coating mode is preferred.

In the loose coating mode, however, the coating material is not airtightly contacted with the optical fiber core, and therefore, the advantage of this mode is that the coating layer may absorb and relieve much damage such as stress and heat applied to the optical cable. Accordingly, the loose coating mode is preferred in some applications. Regarding the water diffusion through the connector joint part in the loose coating mode, the space in the interface between the optical fiber core and the coating material may be filled with a fluid gel-like semi-solid or granular material, and the water penetration into the joint space may be thereby prevented. Further, when any other function such as heat resistance and mechanical function improvement is imparted to the semi-solid or granular material, then the optical fiber cable thus produced may have a multi-functional coating layer. The loose coating may be attained by controlling the extrusion nipple position at the crosshead die and controlling the degree of pressure reduction by the degassing device used, whereby the layer having the above-mentioned space may be formed around the core cable. The thickness of the space layer may be controlled by controlling the nipple thickness and the degree of pressure application/pressure reduction in the coating layer extrusion.

The coating layer to be formed in the first coating step and the second coating step may comprise a flame retardant, an UV absorbent and an antioxidant added thereto not having any negative influence on the light transmittability of the coated cable.

The flame retardant may be any of halogen-containing, for example, bromine-containing resins or additives, and phosphorus-containing compounds. However, from the viewpoint of the safety for reducing toxic gas in firing, the mainstream of the flame retardant is being a metal hydroxide such as aluminium hydroxide or magnesium hydroxide. The metal hydroxide comprises water as its internal crystal water therein. The water results from the water adhesion to the metal hydroxide during its production process, and completely removing it may be impossible. Accordingly, the flame retardation by the use of such a metal hydroxide is preferably attained by adding it to the outermost coating layer of the cable but not adding it to the coating layer that is in direct contact with POF.

For imparting any other different functions to the optical cable, any additional functional coating layers may be suitably laminated at any desired position. For example, in addition to the above-mentioned flame-retardant layer, a barrier layer for inhibiting moisture absorption of POF and a moisture-absorbing material layer for removing moisture from POF may be formed. For forming such a moisture-absorbing material layer, for example, a moisture-absorbing tape or a moisture-absorbing gel may be formed inside a predetermined coating layer or between coating layers. The other functional layers are, for example, a flexible material layer for stress relaxation when the cable is bent, a foam material layer serving as a buffer for external stress relaxation, and a reinforcing layer for increasing the toughness of the cable. Except resin, any other structural material may be used for constituting the optical cable. For example, thermoplastic resin that comprises high-elasticity fibers (high-strength fibers) and/or wires such as high-rigidity metal wires are preferably used for reinforcing the mechanical strength of the optical cable.

The high-strength fibers are, for example, aramid fibers, polyester fibers, polyamide fibers. The metal wires are, for example, stainless wires, zinc alloy wires, copper wires. However, these are not limitative. In addition, an outer metal tube sheathing for cable protection, a supporting wire for overhead cable construction, and any other function for improving wiring operation may be inserted into the outer periphery of the optical cable.

The optical cable may have any desired shape, depending on its use. For example, a bundle cable formed by concentrically bundling optical fiber cores, a tape cable formed by aligning them in lines, a covered cable formed by covering them with a presser coat or a wrapping sheath may be employed depending on the use of the optical cable.

As compared with an ordinary optical cable, the optical cable obtained from POF of the invention has a broader latitude in axis shifting, and therefore, it may be butt-jointed. Preferably, however, an optical connector for joint is disposed at the end of the optical cable, and the cables are surely fixed and connected via the optical connector therebetween. The connector may be any known, commercially-available one, such as PN connectors, SMA connectors, SMI connectors.

The optical cable obtained from POF of the invention is used, favorably as combined with an optical signal processor that comprises various optical members such as light emitter, light receiver, light switch, optical isolator, optical integrated circuit, optical transmit-receive module. In this case, the optical fiber of the invention may be combined with any other optical fibers, and any known techniques relating to it may be employed. For example, reference may be made to *Base and Practice of Plastic Optical Fibers* (issued by NTS); and *Nikkei Electronics* 2001.12.3, pp. 110-127 "Optical device Mounted on Printed-Wiring Board, Now or Never". Combined with various techniques disclosed in these references, the invention may be favorably applied to light-transmission systems suitable to short-range appliances for high-speed large-capacity data communication and control with no influence of electromagnetic waves thereon, typically for example, in-unit wiring for computers and various digital instruments, in-unit wiring for vehicles and ships, optical linking for optical terminals to digital devices or digital devices to each other, and indoor or in-area optical LAN for houses, apartments, factories, offices, hospitals, schools.

Further, as combined with any of those described in *IEICE TRANS. ELECTRON.*, Vol. E84-C, No. 3, March 2001, pp. 339-344, "High-Uniformity Star Coupler Using Diffused Light Transmission", and *Journal of Electronics Packaging Society*, Vol. 3, No. 6, 2000, pp. 476-480 "Interconnection by Optical Sheet Bus Technique"; disposition of light-emitting device relative to optical waveguide face, as described in JP-A 2003-152284; optical busses described in JP-A 10-123350, 2002-90571, 2001-290055; optical branching/coupling devices described in JP-A 2001-74971, 2000-329962, 2001-74966, 2001-74968, 2001-318263, 2001-311840; optical star couplers described in JP-A 2000-241655; optical signal transmission devices and optical data bus systems described in JP-A2002-62457, 2002-101044, 2001-305395; optical signal processor described in JP-A 2002-23011; optical signal cross-connection systems described in JP-A 2001-86537; light transmission systems described in JP-A 2002-26815; multi-function systems described in JP-A2001-339554, 2001-339555; and also other various optical waveguides, optical branching filters, optical connectors, optical couplers, optical distributors, the invention may construct higher-level optical transmission systems for multi-transmit-receive communication. Apart from the above-mentioned light-transmission applications, the invention is also applicable to any other fields of lighting (light conduction), energy transmission, illumination, and sensors.

The invention is described in more detail with reference to the following Examples, in which the material used, its amount and ratio, the details of the treatment and the treatment process may be suitably modified or changed not overstepping the sprit and the scope of the invention. Accordingly, the invention should not be limitatively interpreted by the Examples mentioned below.

EXAMPLE 1

A polymerization chamber having an inner surface of polyvinylidene fluorine and having an inner diameter of 18.5 mm and a length of 17 cm was prepared. A mixed solution was prepared by adding, to a mixture of 80 parts by weight of a compound of the invention, FA-8 (trifluoroethyl methacrylate) and 20 parts by weight of a compound of the invention, FP-31 (pentafluorophenyl methacrylate), dimethylazobisisobutyrate as a polymerization initiator in an amount of 0.1 mol % of all the monomers and laurylthiol as a chain transfer agent in an amount of 0.09 mol %. Thus prepared, the solution was purged with nitrogen for 5 minutes, and then filtered through a PTFE membrane filter (Whatman's Model 6784-1302—the same shall apply hereinunder). This was fed into the polymerization chamber, and sealed up with a Teflon® stopper. Next, the polymerization chamber was kept horizontal, and rotated at 2000 rpm, in which the monomers were thermally polymerized at 95° C. for 2 hours. This is a clad. Next, a mixed solution was prepared by adding, to a mixture of 76.2 parts by weight of FA-8 and 23.8 parts by weight of FP-31, dimethylazobisisobutyrate as a polymerization initiator in an amount of 0.1 mol % of all the monomers and laurylthiol (with no fluorine substitution) as a chain transfer agent in an amount of 0.09 mol %. Thus prepared, the solution was purged with nitrogen for 5 minutes, and then filtered through a PTFE membrane filter. This was injected into the hollow area of the clad. Then, the polymerization chamber was kept horizontal, and rotated at 2000 rpm, in which the monomers were thermally polymerized at 95° C. for 2 hours. This is the first layer of a core. Next, as in Table 1 below, other core layers up to the 10th layer were laminated on it, in the same manner as that for the formation of the first core layer. This was further heated at 95° C. for 6 hours, and a preform having an outer diameter of 18.5 mm and a hole diameter of 3 mm was finally obtained. The amount of the constitutive materials to be fed into the reactor was so controlled that the thickness of the clad could be 1.5 mm and the thickness of each core layer could be constant, 0.625 mm. Thus obtained, the preform was dried at 25° C. and under a reduced pressure of −0.1 MPa for 100 hours, and then its hollow was connected to a degassing device. In that condition, this was thermally stretched in an electric furnace having an inner temperature of 200° C. under a reduced pressure of −4 MPa. Its hollow was lost, and 130 m of POF having an outer diameter of 470 µm was obtained. Thus obtained, the POF was analyzed for its refractive index profile with a two-flux transmission interference microscope (Mizojiri Optics' Model TD-20—the same shall apply hereinunder). Thus obtained, the refractive index profile data were processed for g-power approximation, and the refractive index profile coefficient, g, was 2. The transmission loss through the POF was 120 dB/km at 650 nm, 450 dB/km at 780 nm and 1200 dB/km at 850 nm. The POF was left at 25° C./95% RH for 100 hours, and its transmission loss was determined, and was 122 dB/km at 650 nm, 460 dB/km at 780 nm and 1250 dB/km at 850 nm.

Comparative Example 1

A polymerization chamber of polyvinylidene fluorine having an inner diameter of 19.5 mm and a length of 17 cm was prepared. A mixed solution was prepared by adding, to 100 parts by weight of MMA, dimethylazobisisobutyrate as a polymerization initiator in an amount of 0.1 mol % and laurylthiol as a chain transfer agent in an amount of 0.09 mol %. Thus prepared, the solution was purged with nitrogen for 5 minutes, and then filtered through a PTFE membrane filter. This was fed into the polymerization chamber, and sealed up with a Teflon® stopper. Next, the polymerization chamber was kept horizontal, and rotated at 2000 rpm, in which the monomer was thermally polymerized at 95° C. for 2 hours. This is a clad. Next, a mixed solution was prepared by adding, to a mixture of 96.2 parts by weight of MMA and 3.8 parts by weight of benzyl methacrylate (BzMA), dimethylazobisisobutyrate as a polymerization initiator in an amount of 0.1 mol % and laurylthiol as a chain transfer agent in an amount of 0.09 mol %. Thus prepared, the solution was purged with nitrogen for 5 minutes, and then filtered through a PTFE membrane filter. This was injected into the hollow area of the clad. Then, the polymerization chamber was kept horizontal, and rotated at 2000 rpm, in which the monomers were thermally polymerized at 95° C. for 2 hours. This is the first layer of a core. Next, as in Table 2 below, other core layers were laminated on it, in the same manner as that for the formation of the first core layer. Finally, a preform having an outer diameter of 19.5 mm and a hole diameter of 3 mm was thus obtained. Its hollow was connected to a degassing device, and in that condition, this was thermally stretched in an electric furnace having an inner temperature of 200° C. under a reduced pressure of −4 MPa. Its hollow was lost, and 130 m of POF having an outer diameter of 470 µm was obtained. Thus obtained, the POF was analyzed for its refractive index profile with a two-flux transmission interference microscope. Thus obtained, the refractive index profile data were processed for g-power approximation, and the refractive index profile coefficient, g, was 2. The transmission loss through the POF was 190 dB/km at 650 nm, 780 dB/km at 780 nm and 2870 dB/km at 850 nm. The POF was left at 25° C./95% RH for 100 hours, and its transmission loss was determined, and was 200 dB/km at 650 nm, 930 dB/km at 780 nm and 3200 dB/km at 850 nm. Owing to the OH-vibration absorption loss through water absorption thereof, the POF showed significant transmission loss data.

Comparative Example 2

POF was produced in the same manner as in Example 1, for which, however, isobornyl methacrylate was used in place of the monomers FA-8 and FP-31. Thus obtained, the POF was analyzed for its transmission loss, which was 380 dB/km at 650 nm, 770 dB/km at 780 nm and 1750 dB/km at 850 nm. Then, this was analyzed for its refractive index profile with a two-flux transmission interference microscope. Thus obtained, the refractive index profile data were processed for g-power approximation, and the refractive index profile coefficient, g, was 2. The POF was left at 25° C./95% RH for 100 hours, and its transmission loss was determined, and was 390 dB/km at 650 nm, 780 dB/km at 780 nm and 1850 dB/km at 850 nm.

Comparative Example 3

POF was produced in the same manner as in Example 1, for which, however, t-butyl methacrylate and FP-31 were used as the monomers. Thus obtained, the POF was analyzed for its transmission loss, which was 610 dB/km at 650 nm, 810 dB/km at 780 nm and 1750 dB/km at 850 nm. Then, this was analyzed for its refractive index profile with a two-flux transmission interference microscope. Thus obtained, the refractive index profile data were processed for g-power approximation, and the refractive index profile coefficient, g, was 2. The POF was left at 25° C./95% RH for 100 hours, and its transmission loss was determined, and was 615 dB/km at 650 nm, 820 dB/km at 780 nm and 1850 dB/km at 850 nm.

Comparative Example 4

POF was produced in the same manner as in Example 1, for which, however, FA-1 and phenyl methacrylate were used as the monomers. Thus obtained, the POF was analyzed for its transmission loss, which was 660 dB/km at 650 nm, 850 dB/km at 780 nm and 1850 dB/km at 850 nm. Then, this was analyzed for its refractive index profile with a two-flux transmission interference microscope. Thus obtained, the refractive index profile data were processed for g-power approximation, and the refractive index profile coefficient, g, was 2. The POF was left at 25° C./95% RH for 100 hours, and its transmission loss was determined, and was 670 dB/km at 650 nm, 860 dB/km at 780 nm and 1980 dB/km at 850 nm.

EXAMPLE 2

POF was produced in the same manner as in Example 1, for which, however, SH-8 was used as the chain transfer agent in place of laurylthiol. Thus obtained, the POF was analyzed for its transmission loss, which was 117 dB/km at 650 nm, 445 dB/km at 780 nm and 1180 dB/km at 850 nm. Then, this was analyzed for its refractive index profile with a two-flux transmission interference microscope. Thus obtained, the refractive index profile data were processed for g-power approximation, and the refractive index profile coefficient, g, was 2. The POF was left at 25° C./95% RH for 100 hours, and its transmission loss was determined, and was 122 dB/km at 650 nm, 450 dB/km at 780 nm and 1250 dB/km at 850 nm.

EXAMPLE 3

POF was produced in the same manner as in Example 1, for which, however, FA-1 and FP-1 of the invention were used as the monomers. Thus obtained, the POF was analyzed for its transmission loss, which was 80 dB/km at 650 nm, 110 dB/km at 780 nm and 120 dB/km at 850 nm. Then, this was analyzed for its refractive index profile with a two-flux transmission interference microscope. Thus obtained, the refractive index profile data were processed for g-power approximation, and the refractive index profile coefficient, g, was 2. The POF was left at 25° C./95% RH for 100 hours, and its transmission loss was determined, and was 100 dB/km at 650 nm, 122 dB/km at 780 nm and 160 dB/km at 850 nm.

EXAMPLE 4

POF was produced in the same manner as in Example 3, for which, however, a compound of the invention, SH-16 was used as the chain transfer agent. Thus obtained, the POF was analyzed for its transmission loss, which was 78 dB/km at 650 nm, 105 dB/km at 780 nm and 114 dB/km at 850 nm. Then, this was analyzed for its refractive index profile with a two-flux transmission interference microscope. Thus obtained, the refractive index profile data were processed for g-power approximation, and the refractive index profile coefficient, g, was 2. The POF was left at 25° C./95% RH for 100 hours, and its transmission loss was determined, and was 80 dB/km at 650 nm, 118 dB/km at 780 nm and 150 dB/km at 850 nm.

TABLE 1

|  | FA-8 (wt. pts.) | FP-31 (wt. pts.) |
|---|---|---|
| Clad | 80.00 | 20.00 |
| 1st Core Layer | 76.20 | 23.80 |
| 2nd Core Layer | 72.80 | 27.20 |
| 3rd Core Layer | 69.80 | 30.20 |
| 4th Core Layer | 67.20 | 32.80 |
| 5th Core Layer | 65.00 | 35.00 |
| 6th Core Layer | 63.20 | 36.80 |
| 7th Core Layer | 61.80 | 38.20 |
| 8th Core Layer | 60.80 | 39.20 |
| 9th Core Layer | 60.20 | 39.80 |
| 10th Core Layer | 60.00 | 40.00 |

TABLE 2

|  | MMA (wt. pts.) | BzMA (wt. pts.) |
|---|---|---|
| Clad | 100.00 | 0.00 |
| 1st Core Layer | 96.20 | 3.80 |
| 2nd Core Layer | 92.80 | 7.20 |
| 3rd Core Layer | 89.80 | 10.20 |
| 4th Core Layer | 87.20 | 12.80 |
| 5th Core Layer | 85.00 | 15.00 |
| 6th Core Layer | 83.20 | 16.80 |
| 7th Core Layer | 81.80 | 18.20 |
| 8th Core Layer | 80.80 | 19.20 |
| 9th Core Layer | 80.20 | 19.80 |
| 10th Core Layer | 80.00 | 20.00 |

The invention claimed is:
1. A polymerizable composition for forming an optical device, which comprises a polymerizable monomer of the following formula (1), a polymerizable monomer of the following formula (2), and a chain transfer agent comprising a fluorine-substituted thiol compound of the following formula (5):

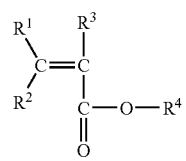

Formula (1)

wherein $R^1$ and $R^2$ each independently represents H or D; $R^3$ represents H, D, $CH_3$, $CD_3$ or a halogen atom; $R^4$ represents an alkyl group having from 2 to 8 carbon atoms and at least partly substituted with a fluorine atom,

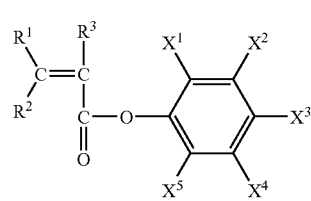

Formula (2)

wherein $R^1$ and $R^2$ each independently represents H or D; $R^3$ represents H, D, $CH_3$, $CD_3$ or a halogen atom; $X^1$ to $X^5$ each independently represents H, D, a halogen atom or $CF_3$, and at least one of $X^1$ to $X^5$ is a halogen atom or $CF_3$, Formula (5)
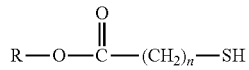

wherein R represents an alkyl group at least partly substituted with a fluorine atom, or an aryl group at least partly substituted with a fluorine atom or a group $CF_3$; and n indicates an integer of from 1 to 12.

2. The polymerizable composition for forming an optical device as claimed in claim 1, wherein the degree of deuteration of the compound of formula (1) in the composition is from 95% to less than 100%.

3. The polymerizable composition for forming an optical device as claimed in claim 1, wherein the degree of deuteration of the compound of formula (2) in the composition is from 95% to less than 100%.

4. The polymerizable composition for forming an optical device as claimed in claim 1, which further comprises a polymerization initiator.

5. The polymerizable composition for forming an optical device as claimed in claim 1, wherein the fluorine content of the fluorine-substituted thiol is at least 20% by mass.

6. The polymerizable composition for forming an optical device as claimed in claim 1, which further comprises a dopant.

7. A method for producing an optical device, which comprises polymerizing the polymerizable composition for forming an optical device of claim 1.

8. A method for producing an optical device, which comprises polymerizing the polymerizable composition for forming an optical device of claim 1 thereby to form a core that has a gradually increasing refractive index profile.

9. A method for producing an optical device, which comprises injecting the polymerizable composition for forming an optical device of claim 1, into a cylindrical chamber rotating around a center of the axis thereof held horizontally, and polymerizing it therein to form a clad that has a constant refractive index from the wall face of the cylindrical chamber to the center thereof, and injecting the polymerizable composition for forming an optical device of claim 1 in which the compositional ratio of the monomer of formula (2) to the monomer of formula (1) gradually increases, into the chamber and polymerizing it therein to form a core that has a gradually increasing refractive index profile.

10. An optical device produced according to the production method of claim 7.

11. The optical device as claimed in claim 10, which has a refractive index profile region where the refractive index thereof varies.

12. The optical device produced according to the production method of claim 8.

13. The optical device produced according to the production method of claim 9.

14. An optical device comprising a copolymer of a polymerizable monomer of the following formula (1) and a polymerizable monomer of the following formula (2), said polymerizable monomers of formulas (1) and (2) being copolymerized in the presence of a chain transfer agent comprising a fluorine-substituted thiol compound of the following formula (5):

Formula (1)
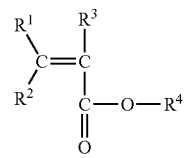

wherein $R^1$ and $R^2$ each independently represents H or D; $R^3$ represents H, D, $CH_3$, $CD_3$ or a halogen atom; $R^4$ represents an alkyl group having from 2 to 8 carbon atoms and at least partly substituted with a fluorine atom, Formula (2)
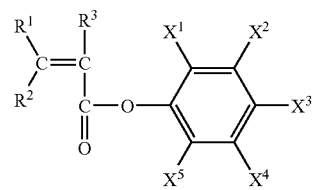

wherein $R^1$ and $R^2$ each independently represents H or D; $R^3$ represents H, D, $CH_3$, $CD_3$ or a halogen atom; X' to $X^5$ each independently represent represents H, D, a halogen atom or $CF_3$, and at least one of $X^1$ to $X^5$ is a halogen atom or $CF_3$, Formula (5)
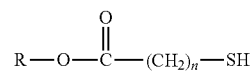

wherein R represents an alkyl group at least partly substituted with a fluorine atom, or an aryl group at least partly substituted with a fluorine atom or a group $CF_3$; and n indicates an integer of from 1 to 12.

15. The optical device as claimed in claim 14, which comprises a copolymer of a polymerizable monomer of formula (1) and a polymerizable monomer of formula (2) and in which the copolymers of the type each having a different copolymerization ratio are laminated in layers.

16. The optical device as claimed in claim 15, wherein the copolymers each having a different copolymerization ratio are laminated concentrically with each other and are so disposed that the copolymerization ratio may monotonically change from the outer periphery to the center part of the device.

* * * * *